United States Patent

Johansson

[11] Patent Number: 5,928,548
[45] Date of Patent: Jul. 27, 1999

[54] ELECTRIC CUSHION HEATER

[75] Inventor: Göran Johansson, Charlottenberg, Sweden

[73] Assignee: Tocksfors Verkstads AB, Tocksfors, Sweden

[21] Appl. No.: 08/776,719
[22] PCT Filed: Jun. 20, 1995
[86] PCT No.: PCT/SE95/00751
 § 371 Date: Mar. 7, 1997
 § 102(e) Date: Mar. 7, 1997
[87] PCT Pub. No.: WO96/03014
 PCT Pub. Date: Feb. 1, 1996

[30] Foreign Application Priority Data

Jul. 18, 1994 [SE] Sweden .................... 9402508

[51] Int. Cl.$^6$ ............... H05B 3/34; H05B 1/00
[52] U.S. Cl. ........................ 219/528; 219/217
[58] Field of Search ............... 219/527, 528, 219/529, 211, 212, 217, 536, 542, 544, 202; 338/288–289, 291, 290, 315, 317, 280, 281

[56] References Cited

U.S. PATENT DOCUMENTS

| | | | |
|---|---|---|---|
| 2,154,184 | 4/1939 | Roberts | 219/549 |
| 3,015,016 | 12/1961 | Cole | 219/549 |
| 3,033,970 | 5/1962 | Eisler | 219/542 |
| 3,178,561 | 4/1965 | Wolf | 219/549 |
| 3,594,547 | 7/1971 | Quinn | 219/529 |
| 3,739,142 | 6/1973 | Johns | 219/549 |
| 4,629,868 | 12/1986 | Svensson | 219/528 |
| 4,964,674 | 10/1990 | Altmann et al. | 219/217 |

FOREIGN PATENT DOCUMENTS

| | | |
|---|---|---|
| 124370 | 10/1972 | Denmark . |
| 0331762 | 9/1989 | European Pat. Off. . |
| 0347969 | 12/1989 | European Pat. Off. . |
| 2537579 | 7/1977 | Germany . |
| 3300182 | 7/1984 | Germany . |

*Primary Examiner*—Teresa Walberg
*Assistant Examiner*—Sam Paik
*Attorney, Agent, or Firm*—Dvorak & Orum

[57] ABSTRACT

An electric heater intended for heating foam-moulded cushions, for instance for vehicle seats or mattresses. The heater consists of an electric conductor, e.g. an insulated or non-insulated metal wire, which is configured into the shape of one or several bands of closely juxtaposed bights, each one of which comprises a loop and an open portion facing away from the associated loop, substantially all open portions being interconnected by means of local interconnections, e.g. by means of glue, plastic welds or seams, whereby one or several bands of coherent patterns are formed, said patterns intended to be positioned in a mould for casting of cushions, such that the heater to an essential extent becomes anchored in the cushion.

10 Claims, 4 Drawing Sheets

ELECTRIC CUSHION HEATER

TECHNICAL FIELD

The subject invention concerns an electric heater designed to heat foam-moulded cushions, for instance in vehicle seats or mattresses.

BACKGROUND OF THE INVENTION

Electrically heated vehicle seats have been known since many years. The heating effect is generated by electric current which is supplied through a conductor having a suitable resistivity that ensures the desired degree of heat in the conductor. The resistance wire is positioned be- tween various layers of a textile material or a plastics material, known as carriers, forming a sheet-like heating element. Several such sheet layers are then to be glued together, sandwiching between them the heating wire proper. This is a comparitively expensive process. The finished heating element is then glued to the seat cushion, the latter usually being of foam-moulded construction. The seat cover is then placed on top. Usually, lashing trech are used for tightening the seat cover. This means that at least one such trench is formed in the foam-moulded cushion and the seat cover material is pulled down into the trench. When a sheet is used for the seat cushion this sheet is often also pulled down into the lashing trench, allowing the cover to be pulled down over the sheet. A condition therefor is that the lashing trench is essentially straight. In case the lashing trench is curved and/or several such lashing trenches are used the heater usually is in the form of several separately heated sheets. Obviously, this increases the costs considerably. When the vehicle is exposed to loads considerable shape changes occur in the foam-moulded cushion and usually the lashing trench is compressed laterally. In time this may lead to rupture of the electrical conductor with a result that the heater stops functioning. In case of heaters that are placed in the seat back the problems are similar, although seat backs are exposed to less load. Also in the case of cushions intended for furniture and bed mattresses there might be a need for electric heaters. The problems in connection with these applications are similar in several respects.

THE PURPOSE OF THE INVENTION

The purpose of the subject invention is to considerably reduce the above outlined problems by creating an electric heater intended to be embedded into foam-moulded cushions or into a part component of the cushion or the mattress during the casting operation.

SUMMARY OF THE INVENTION

The above purpose is achieved by the electric heater in accordance with the invention, exhibiting the characteristics appearing from the appended claims.

The electric heater in accordance with the invention thus essentially is characterised by the fact that it consists of an electric conductor, e.g. an insulated or non-insulated metal wire which is configured into the shape of one or several bands of closely juxtaposed bights each one of which comprises a loop portion and an open portion facing away from the associated loop, substantially all open portions being interconnected by means of local interconnection means, e.g. by means of glue, plastic welds or seems, whereby one or several bands of coherent patterns are formed, said patents intended to be positioned in a mould for casting of cushions or parts of cushions such that the heater to an essential extent becomes anchored in the cushion, or a part component of said cushion, in the very casting operation. Consequently, the electric heater in accordance with the invention comprises no carrier in the shape of a sheet but consists of one or several bands of interconnected patterns of the conductor. This means that these patterns have a very open or airy configuration facilitating their embedment in a foam-moulded cushion. Attempts to embed traditional heating elements together with carrier sheets during the casting operations have failed on account of the closed configuration of such elements, which have made them prone to be pressed upwards towards the surface during the casting. Usually the greatest advantages are achieved when the heater in accordance with the invention is embedded in a cushion or mattress in one piece during casting. It is likewise possible to conceive embedding the heater, in the casting operation in a thinner cushion which is a part of the overall cushion, preferably by the latter being glued on top. The local interconnection means preferably are formed by at least one strip extending in the direction of extension of the pattern and the conductor is secured to the strip by means of glue, tape or by seems. The configuration of the pattern could be varied within wide limits and the electrical connection of the two ends of the conductor could be arranged in several different ways. This will become clearly apparent from the detailed description of various embodiments and will be more easily understood when studying the drawing figures. Further particularities and advantages offered by the invention will also become apparent from the appended description of various embodiments.

BRIEF DESCRIPTION OF THE DRAWING FIGURES

The invention will be described in closer detail in the following by means of various embodiments thereof with reference to the accompanying drawings in which identical numeral references have been used in the various drawing figures to denote corresponding parts.

Figure 5:
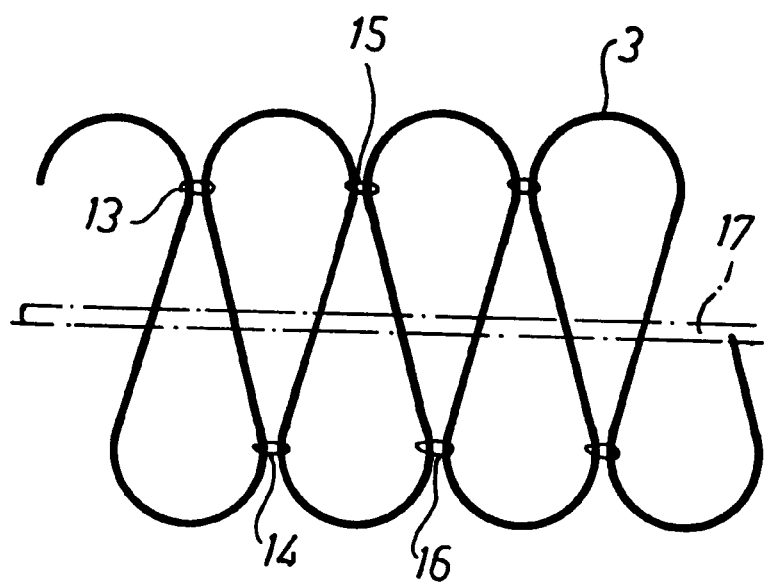

FIG. 5 illustrates a similar loop-shape variety. However, in this case, local interconnection means are used that are not joined together by longitudinally extending strips. They could be glue or seam interconnections. In dash-and-dot lines is shown an alternative comprising one single strip extending longitudinally close to the middle of the pattern.

Figure 6:
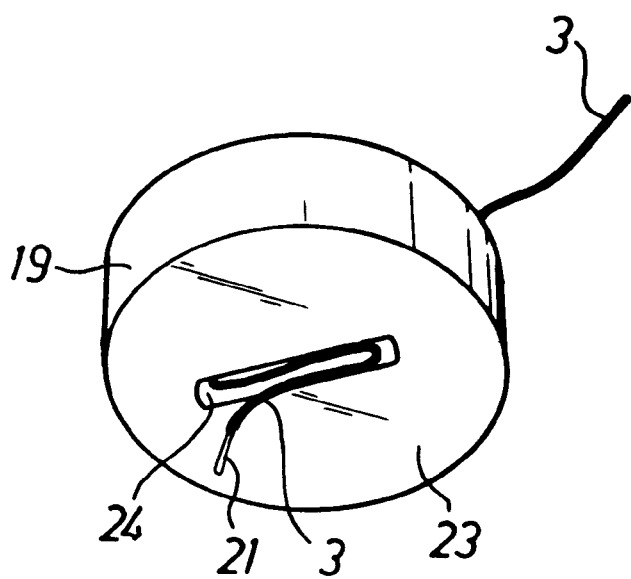

FIG. 6 illustrates a round casting embedment body intended to facilitate the electrical connection of the heater after embedment thereof.

Figure 7:
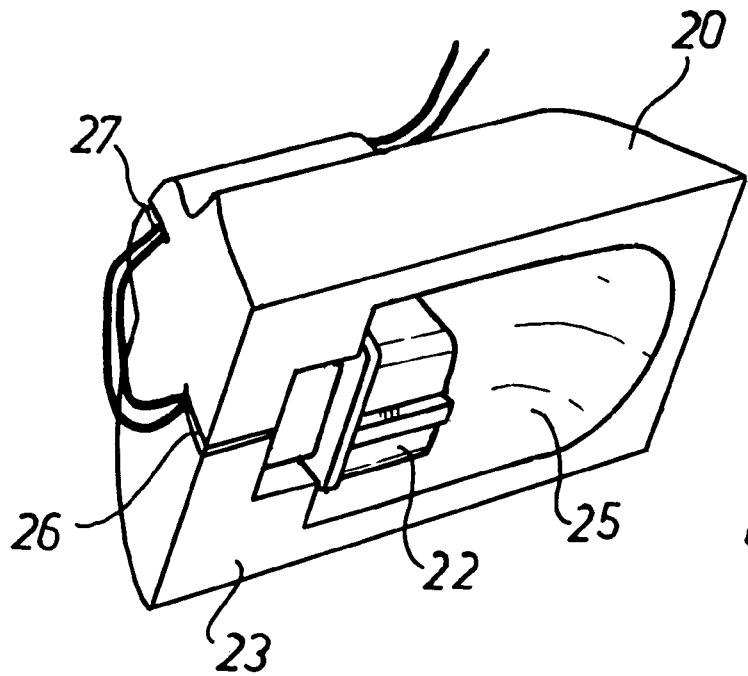

FIG. 7 illustrates a somewhat differently shaped embedment body housing a connector intended for both ends of the conductor 3.

DETAILED DESCRIPTION OF PREFERRED EMBODIMENTS

Figure 1:
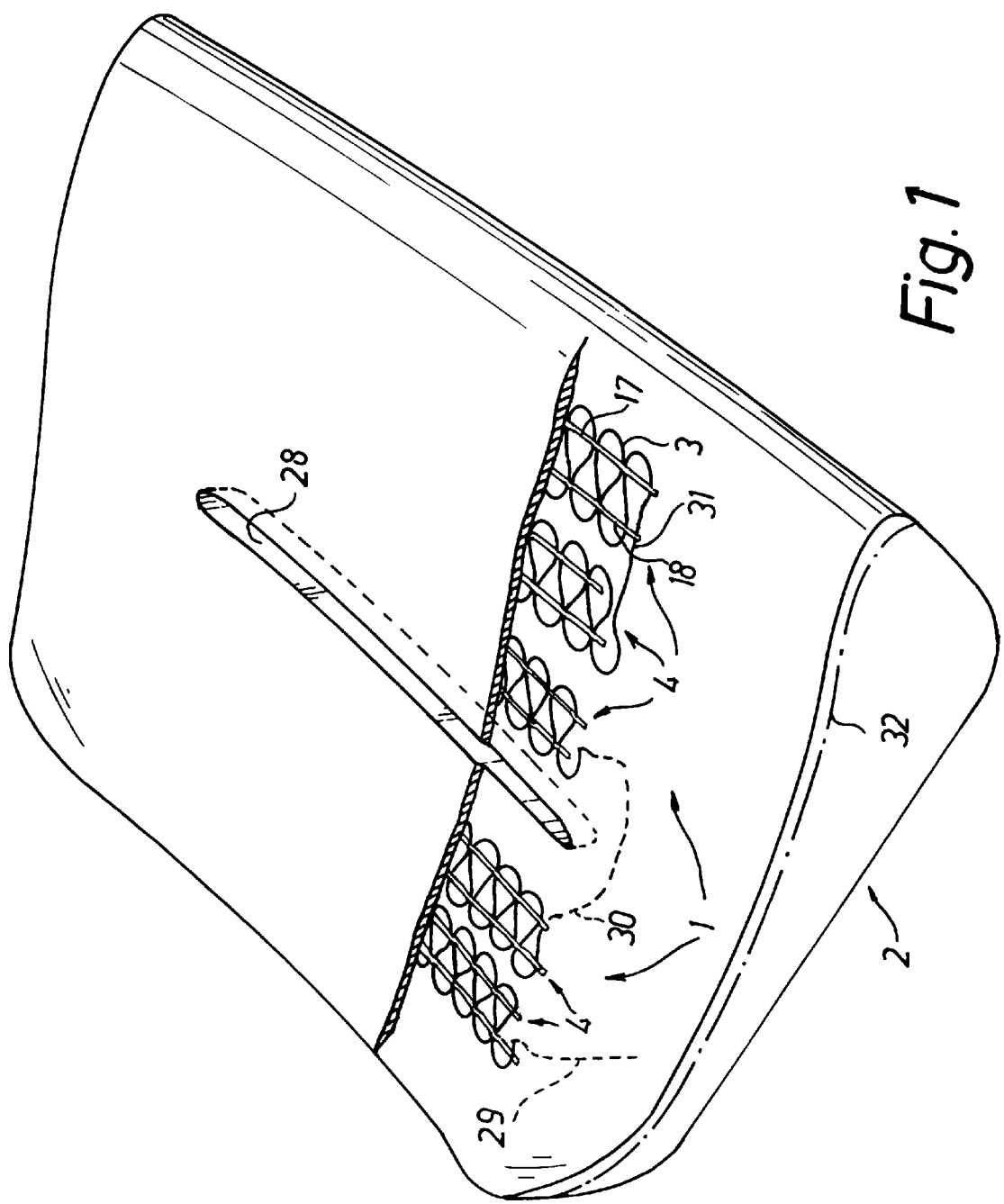
FIG. 1 is a perspective view of the electric heater in accordance with the invention, embedded in the cushion of a vehicle seat. Part of the surface layer of the cushion has been cut away to partly expose the heater.

FIG. 1 illustrates in a perspective view a seat cushion 2 for a vehicle seat. The seat cushion is provided with an electric heater 1. The latter consists of several bands 4 of an electric conductor 3. The conductor is shaped into a number of closely juxtaposed bights together forming individual bands 4. In the example shown five such bands are provided and two such bands are placed behind a lashing trench 28 and three in front thereof. The lashing trench 28 is used to tighten the seat cover material around the cushion. It consists of trough formed during the casting with a cast-embedded metal profile member at the bottom. As illustrated in FIG. 1 an input end 29 is associated with the rearmost band 4. The input end 29 preferably is cast-embedded so as to extend through the cushion to its bottom face where it is electrically connected but other solutions are possible. The electric conductor 3 extends from one band 4 to the neighbouring one 4. Since the cushion surface layer is only partly removed this is apparent only as concerns the transition between the two foremost bands 4 and as regards such transition between the second and the third bands as seen from the rear. In this case the transition part passes through the cushion and below the lashing trench 28. In the casting operation the conductor, denominated transition portion 30 in this section, simply has been pulled down with respect to the surface of the cushion. Precisely through the very method of embedding the heater 1 during casting it becomes possible to carry transition parts 30, 31 from one band to another one positioned deeper down in the cushion. This is an advantage since it allows the transition portion 30 to be pulled down below the lashing trench 28. It is likewise an advantage because the load and stress to which the transition portion 30 is exposed becomes less pronounced owing to the reduced deformation of the cushion at lower levels. In the same way as the input end 29 an output end, obscured from view in the drawing figure, preferably leads from the opposite end of the electric heater and down through the cushion to be electrically connected on the bottom side of the cushion.

In accordance with the embodiment illustrated the seat cushion 2 consists of one single moulded cushion and the heater thus is cast-embedded inside the cusion. However, the cushion 2 may equally well consist of several layers. For instance, a softer surface layer could be used. The dash and dot line 32 indicates an imagined variety according to which the seat cushion 2 consists of two parts, line 32 being the demarkation line. In this case the heater 1 prefer-ably is cast into the upper part. In this case the upper part is a part component of the overall cushion. When this arrangement is used it is convenient to carry the input and output ends of the conductor all the way out to one side of the seat cushion. Preferably, the upper cushion part is glued to the lower part. This divided multi-part configuration of the cushion is less rational from an economical point of view but could have other advantages, for instance with respect to comfort.

Conventional heaters comprise a carrier which is glued on top of the seat cushion and it is also usually led down into the lashing trench. This means that in this case the lashing trench needs to be essentially straight. When a curved lashing trench is used it becomes necessary to use two separate carriers, which increases the costs. The heater in accordance with the invention, on the other hand, may be made in one single piece irrespective of the complexity of the chair structure with respect to the lashing trenches, i.e. their numbers and shapes. In other words, the more complex the design of the chairs in this respect the greater the difference in costs.

As appears from FIG. 1 a number of bands of interconnected and coherent patterns are formed, in this case five such bands. The pattern within each band 4 may be kept together in various ways. This appears more in detail from FIGS. 2–5 inclusive, showing various examples of patterns and pattern interconnection means. It is often desirable that the various bands are mutually interconnected or kept together, allowing more convenient handling when they are to be deposited for instance in the mould. One way of achieving such a coherent structure is to join the outer ends of the strips 17, 18 which keep each individual band together, to a transverse strip. In this way a boarder of strips is formed around the pattern. Another way is to provide the pattern with a transport carrier or wrapping which maintain the integrity of the bands 4 and which is removed once the pattern is in position inside the mould.

Figure 2:
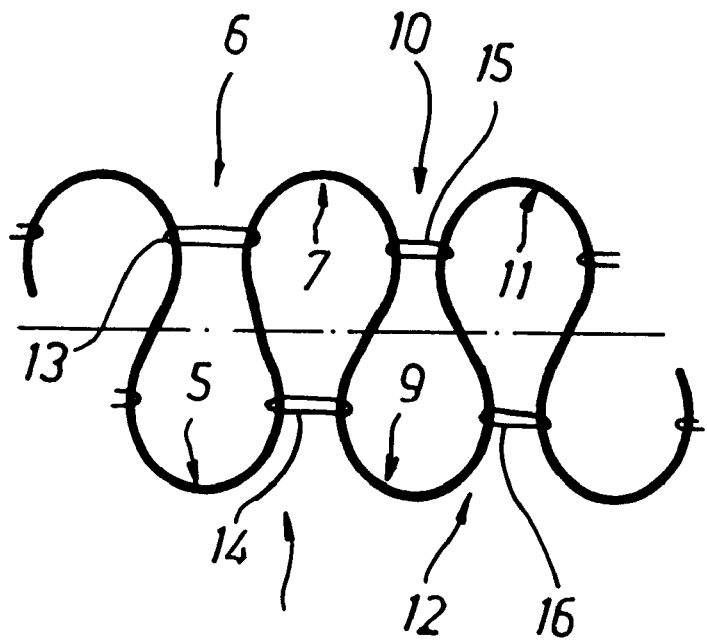
FIG. 2 is a part of a band consisting of several loops interconnected by local interconnection means.
Figure 3:
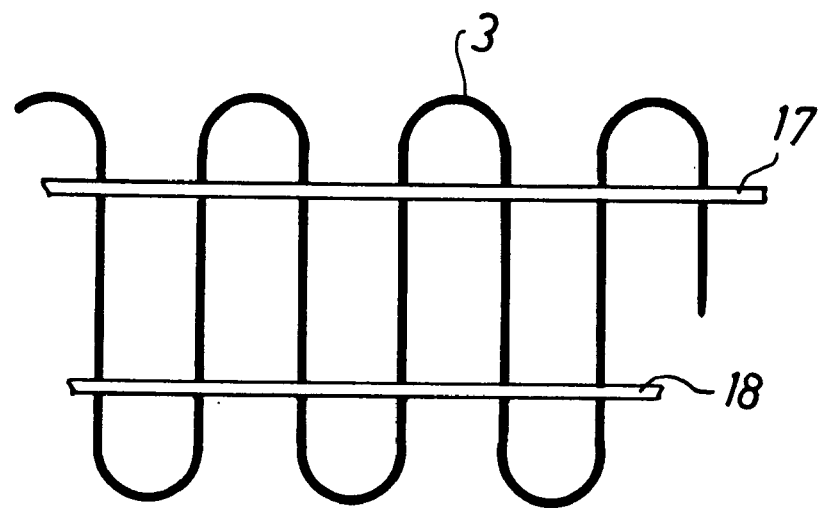
FIG. 3 illustrates somewhat differently shaped loops and in this case the local interconnection means consists of two strips.
Figure 4:
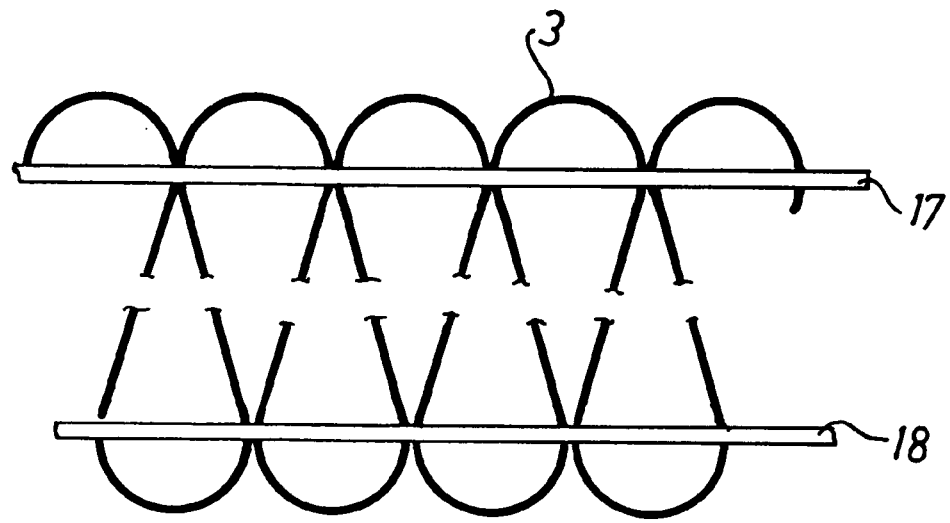
FIG. 4 illustrates a pattern according to which each loop is a maximum size whereby the conductor 3 of sequentially arranged loops meet. Two strips serve as the local connection means.

FIG. 2 illustrates a part of a band 4 of closely juxtaposed bights. Each bight consists of a loop part 5, 7, 9, 11 and an open part 6, 8, 10, 12 facing away from the loop part. Essentially all open parts are interconnected by means of local interconnection means 13, 14, 15, 16. The local interconnections could be produced through glueing, plastic fusion or by means of seems. The local interconnection means could also be arranged in longitudinally extending strips 17, 18 as illustrated in FIG. 3. In this manner one or several bands 4 of integral or coherent patterns are formed, intended to be positioned in a mould to be embedded in the cushions in the very casting operation. The manufacture of the heater 1 could be effected e.g. by winding the electrical conductor 3 around cores in the zick-zack pattern illustrated in FIGS. 2–5. In this case each band is formed by a group of cores and between them the conductor is carried in the form of a transition part, such as 30 or 31 in accordance to FIG. 1, over to the neighbouring band. The local interconnection means 13, 14, 15, 16 could also be in the form of plastic clips. In this case they comprise a lower part which is positioned inside the tool together with the cores and an upper part which is pressed onto the lower one, or else they are hinged allowing them to be opened and closed about the electric conductor 3. One practical method of obtaining the local interconnections is to position them in one or several longitudinally extending strips 17, 18, as illustrated in FIGS. 3–5, inclusive. The strip could be a two-piece construction, comprising a lower piece placed in position before the conductor is deposited thereon, and an upper piece which is glued to the lower piece once the conductor is in position. Preferably, one or both strip pieces are self-adhesive, like tape. In this manner the loops are immobilized whereby a coherent integral pattern is formed. The conductor could also be attached to the strip by means of glue, tape or seams. In accordance with the varieties illustrated in FIGS. 3 and 4, two strips 17, 18 are used, which form the local interconnection means and the strips are positioned close to the mouths of their respective ones of the open parts 6, 8, 10, 12.

In accordance with the varieties shown in FIGS. 4 and 5 the pattern is configured in such a manner that two juxtaposed loops 5, 9 that are turned in the same direction essentially meet and that a local interconnection means is formed at each one of these points of contact with the aid of glue, fusion of the insulation or by means of seams. When the conductors meet in this manner it is natural to use an insulated conductor. In accordance with the variety in FIG. 5 a small gap remains between the conductors. In this case it is possible to use non-insulated wire, provided that each local interconnection means 13, 14, 15, 16 is such that it positively prevents the conductors from coming into contact with one another. For instance, the interconnection means could be in the form of a plastic clip having a conductor-separating partition wall. A simple and obvious solution, as shown in FIG. 5, is to glue the conductors together or fuse their insulation at the points of the local interconnections 13,

14, 15, 16. In combination with this arrangement, one single longitudinally extended strip 17 could be used, if desired. If so, it is placed in the centre of the pattern, as seen laterally. It is also conceivable to use only the strip 17 without the local interconnection means 13, 14, 15, 16. The result is a fairly losely integrated pattern which, however, functions well.

Some various examples of loop shapes have been given but obviously other designs could be used. For instance, sinus curve types of configurations could be used. The loop shapes according to FIGS. 4 and 5 are advantageous in as much as they both allow simple local interconnections 13, 14, 15, 16 to be formed between neighbouring conductor sections, and, on account of the large-size loops possess flexibility in the transverse direction. The latter is important since seat cushions in vehicle seats are exposed to tensile stress when the person occupying the seat changes position, and so on. In this respect the solution in accordance with FIG. 3 is not on par with the other solutions but could function well when the height of the pattern is limited.

In the embedment-through-casting operation the pattern preferably is seamed between a number of pins in the mould, for instance four such pins. Preferably, the loops are hooked about the pins.

FIGS. 6 and 7 illustrate castin embedment bodies 19, 20, i.e. bodies that are embedded in the cushion during the casting operation, said bodies encompassing one or both ends of the conductor and any connectors 21, 22 with which the conductor is provided. Each embedment body 19, 20 has an attachment surface 23 which usually is flat and which is secured to the mould by means of glue or the like or by means of doubleface adhesive tape. In this manner the conductor ends or a connector coupled thereto are guaranteed to be available for electrical connection of the electric heater after cast-in of the cushion. FIG. 6 illustrates a casting embedment body having a cylindrical external shape and an internal space 24 which open towards the attachment surface 23. The space 24 is oblong but could also have another shape, for instance round, and the wire is folded or rolled up inside the space so that in use it becomes possible to pull out the wire from the space, for electrical connection. The embedment body 19 could be punched from e.g. foamed plastics. On its upper face a piece of tape or the like is positioned to serve on the one hand to retain the conductor 3 and on the other to close the internal space 24 at the top thereof. The attachment face 24 preferably is provided with a tape comprising a protected layer which is torn off before the glueing to the mould. But obviously it could also be glued by means of some rapid-setting glue. At its end the conductor 3 is mounted with a connector 21. In its most simple form it may consist solely by a simple soldering in order to keep the wire filaments together. However, it could also consist of a flat pin or the like. The embedment body 19 encloses only one of the ends of the conductor 3. In other words, an embedment body is required also for the opposite end of the conductor 3. However, it goes without saying that the embedment body could be made in an identical manner but house both ends of the conductor 3 and each one obviously could have its individual connector 21.

FIG. 7 illustrates a cast-in embedment body 20 housing a connector 22 configured to be used for both ends of the conductor 3. The embedment body is configured to maintain the connector 22 in position and is provided with enough space to allow the cooperating connector to be threaded thereon upon electrical connection. The embedment body proper for this reason is made from a sturdier material than required from the embedment body 19 in accordance with FIG. 6. For instance it could be made from a foam-moulded material having a somewhat higher density. The embedment body 20 is provided with two slits 26, 27. This allows the connector 22 to be first mounted on the two conductor 3 ends and then to be positioned inside the embedment body 20. Subsequently, the two conductor ends are carried through slits 26 and 27. The slits 26 and 27 preferably end in a round opening to accommodate the conductors 3. The purpose of slit 27 is to contribute to relieve the conductor from wire loads. For in the casting operation the conductor between the slits 26 and 27 will be securely anchored inside the cushion 2. However, obviously it is not entirely necessary to make use of the slit 27, for which reason the latter could be eliminated. Obviously other embedment bodies designed for other electrical functions than to serve the heater 1, could be cast into the cushion.

It is likewise possible to produce excellent electrical connections without making use of embedment bodies 19, 20. One manner of achieving this is to provide attachments inside the mould for the connectors 21. In this case the attachments maintain the connector in its correct position inside the tool and ensures that there is enough space to allow a matching connector, usually a female connector, to be attached. Obviously it is likewise possible to simply pull out the wires upon the casting as the tool is partitioned.

The embodiment as described concerns a seat cushion 2 for a vehicle seat. Obviously, the same technique could be used also in the back pad of a car seat. Since the pressure strain on back rest pads is smaller, the strain on the heater inside that pad normally will be smaller. Naturally, also supporting pads in the back rest as well as head rests and arm rests could be provided with electrically heated means. Of course the same is true as regards the rear seat of the car or sofas as naturally also in the case of furniture, such as sofas and armchairs. The electrical heater in accordance with the invention could also be used in mattresses for beds and the like. In the case of large scale manufacturing of for instance vehicle seats or mattresses it is obviously natural that specially design heaters are deviced. In the case of small scale manufacture of different cushions or mattresses it could, on the other hand, be suitable to produce the heater in continuous lengths for custom-fit purchase. The customer may then position the heater in accordance with the pattern array desired. This possibility is made even more convenient if either or both strips 17, 18 are cut off or torn off at the appropriate points to allow curves or various transitions to be formed. Obviously, it is possible to produce thin cushions having a thickness of say 5 to 10 mm in the areas where the heater is cast into this layer. This thin mattress is then glued on top of a conventional mattress. This method somewhat resembles the conventional version consisting of electrical heaters that are glued to carriers. But the essential difference is that the heater in accordance with the invention is cast into a foam material having a similar structure to that of the fundamental cushion or mattress proper. This makes it possible to obtain a safer glue bond between the upper, thinner cushion to the cushion or mattress underneath. The requirements as regards strength are most strict in the case of vehicle cushions and it is natural that the upper thinner cushion covers the entire or major part of the car seat proper.

In addition, it is possible to position the heater between part components of a cushion which are later glued or fused together. The end result strongly resembles that obtained in casting operations.

I claim:

1. In a molded foam seat cushion, an electric heater assembly for heating said cushion comprising:

an embedment body formed within a molded seat cushion, said embedment body having an interior space, an electric conductor comprised of one of an insulated and non-insulated metallic wire having a pair of ends, said wire configured into a plurality of closely juxtaposed bights, each bight defined by a closed loop and an open portion, said open portion facing away from the closed loop, wherein every other adjacent bight is facing a same direction and is in contact with one another, said open portions interconnected such that a tear-drop pattern is formed in each bight, said interconnection created by one of gluing, fusing, or by a seam, said contacts interconnected such that said pattern remains intact even while stressed from operational use in a seat cushion, wherein each of said wire ends are housed within the interior space of said embedment body and connected together by a connector, said embedment body having an attachment surface which is anchored within an underside of a molded seat cushion.

2. The electric heater assembly as claimed in claim 1, wherein said bights are interconnected by at least one common strip extending in the same direction of extension of said pattern, and wherein the conductor is secured to the strip.

3. The electric heater assembly as claimed in claim 2, further including a second strip, wherein each of the strips are disposed adjacent the open portions of each bight.

4. The electric heater assembly as claimed in claim 1, wherein the ends of said wires are connected together by plastic clips.

5. The electric heater as claimed in claim 1, wherein the open portions of two adjacent bights face the same direction such that said bights contact with one another and are interconnected by one of glue, fusing, or by a seam.

6. An electric heater according to claim 5, wherein the ends of the electric conductor are provided with a cast-in embedment body which is separate or common to both conductor ends, said body housing the conductor end(s) and any connectors with which said conductor is provided and having a usually flat attachment surface which is anchored inside a mould by means of glue or other adhesive or by means of double-face adhesive tape, said arrangement preventing the conductor ends from being embedded inside the cushion in the casting operation but being accessible for electric connection.

7. The electric heater assembly as claimed in claim 1, wherein the interior space of said embedment body is defined by a side wall enclosing the space, said side wall formed with a slit therein for allowing the conductor to be placed inside the space and passed through said slit.

8. The electric heater assembly as claimed in claim 1, wherein the embedment body is provided with an additional slit which is positioned opposite to the attachment surface and which is used to provide load relief.

9. The electric heater assembly according to claim 1, further including a second embedment body, wherein each conductor end is housed within a separate and respective embedment body.

10. An electric heater for heating foam-molded cushions, comprising:

an electric conductor comprised of one of an insulated and non-insulated metallic wire having a pair of ends, said wire configured into a plurality of closely juxtaposed bights, each bight defined by a closed loop and an open portion defining a mouth, said open portion defining a mouth of said bight, each open portion facing away from the closed loop, wherein every other adjacent bight is facing a same direction and is in contact with one another, said open portions interconnected such that a tear-drop pattern is formed in each bight;

a pair of spaced interconnection means comprising respective individual strips, each strip extending across said pattern in parallel fashion to each other, each of said strips respectively disposed adjacent to the mouth of the bight, each of said strips including plastic clips thereon, said clips spaced to correspond with a mouth of said including plastic clips thereon, said clips spaced to correspond with a mouth of said bight;

a pair of embedment body housings, one said body housing respectively attached at each end of said electric conductor, each respective body housing having a planar attachment surface and an interior space opening towards said attachment surface, said interior space for housing said conductor wire therein in a roll-shape form.

\* \* \* \* \*